(12) United States Patent
Yamaguchi

(10) Patent No.: US 6,204,575 B1
(45) Date of Patent: Mar. 20, 2001

(54) METHOD OF VERIFYING AN EXTENSION AREA SENSOR CONTROLLED, MASTER CONTROLLER OF AREA SENSORS, AND COVER TO BE USED WHEN NO SLAVE CONTROLLER IS ADDED

(75) Inventor: Akiji Yamaguchi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/206,373

(22) Filed: Dec. 7, 1998

(30) Foreign Application Priority Data

Jun. 2, 1998 (JP) .................................................. 10-153200

(51) Int. Cl.[7] ...................................................... H02B 1/24
(52) U.S. Cl. ............................. 307/119; 307/112; 307/125
(58) Field of Search ..................................... 307/112, 116, 307/119, 125, 130, 134, 118, 117; 192/129 R, 133, 129 A

(56) References Cited

U.S. PATENT DOCUMENTS

| 4,309,696 | * | 1/1982 | Nagai et al. | 340/515 |
| 5,202,585 | * | 4/1993 | Aoyagi et al. | 307/116 |
| 5,256,909 | * | 10/1993 | Tigges et al. | 307/116 |
| 5,637,928 | * | 6/1997 | Nakajima et al. | 307/10.2 |

* cited by examiner

Primary Examiner—Fritz Fleming
(74) Attorney, Agent, or Firm—Sughrue, Mion, Zinn, Macpeak & Seas, PLLC

(57) ABSTRACT

A method of verifying an addition of a slave controller to a master controller of more than one area sensor, including an electrical mechanism which determines if a slave controller is present, or detects whether a cover having a projection or a shorting circuit is mechanically attached to the master controller if no slave controller is present, the presence of the cover indicating that no slave controller is added, and if neither the slave controller nor the cover is detected, an abnormality is indicated.

9 Claims, 7 Drawing Sheets

MASTER CONTROLLER 4

SLAVE CONTROLLER 5
(USED WHEN AREA
SENSOR IS ADDED)

COVER 64
(USED WHEN NO SLAVE
CONTROLLER IS ADDED)

MASTER CONTROLLER 4

COVER 64
(USED WHEN NO SLAVE
CONTROLLER IS ADDED)

MASTER CONTROLLER 4

SLAVE CONTROLLER 5
(USED WHEN AREA
SENSOR IS ADDED)

MASTER CONTROLLER 4

COVER 64'
(USED WHEN NO SLAVE
CONTROLLER IS ADDED)

MASTER CONTROLLER 4    SLAVE CONTROLLER 5

MASTER CONTROLLER 4    SLAVE CONTROLLER 5

METHOD OF VERIFYING AN EXTENSION AREA SENSOR CONTROLLED, MASTER CONTROLLER OF AREA SENSORS, AND COVER TO BE USED WHEN NO SLAVE CONTROLLER IS ADDED

BACKGROUND OF THE INVENTION

The present invention relates to a controller of an area sensor having a plurality of optical axes provided within a detection area, each optical axis connecting a set of a light-projecting device and a light-receiving device. In particular, the invention relates to the safety of extension of a controller for use with a plurality of such area sensors.

An area sensor is a kind of switch that comprises a light projector having light-projecting devices and a light receiver having light-receiving devices, a set of one light-projecting device and one light-receiving device forming an optical axis or an optical channel. If any one of the optical axes is interrupted by a moving object, the area sensor turns on. Working as a switch, the area sensor ensures the safety of the operators of machine tools, punching machines, press machines, brakes, molding machines, automatically controlled machines, coiling machines, robots, casting machines and so forth. In the case of a press machine, the area sensor is positioned in a detection area which is the dangerous zone of the machine and when fingers or any other part of the operator's body enters the detection area and interrupts a particular optical axis, the sensor detects that phenomenon and takes an immediate protective action by shutting down the machine or issuing a warning signal.

The area sensor is also used in an automatic production line at plant, where it detects the presence or absence of a moving article and signals for a transfer to the next step upon detecting the article. In this case, the area sensor works as a sensor for automatic control.

An area sensor 1 of the type is shown in FIG. 9 and it comprises a light projector 2 in which a plurality of light-projecting devices 21 such as light-emitting diodes (LEDs) that emit infrared or other radiations are spaced on a specified pitch (in FIG. 9, eight light-projecting devices are provided), a light receiver 3 in which a corresponding number of light-receiving devices 31 such as photodiodes 31 that are spaced on a specified pitch in correspondence with the light-projecting devices 21 so that they receive optical axes 9 which are the infrared beams emitted from the light-projecting devices 21 in the light projector 2, and a controller 4 that controls both the light projector 2 and the light receiver 3 via cables 7. The light projector 2 and the light receiver 3 are provided in a face-to-face relationship such that the projector 2 is positioned on one side of the detection area where the operator of a press machine or the like must be protected whereas the receiver 3 is positioned on the other side of the detection area. Optical beams issued from the light-projecting devices in the light projector 2 travel to the corresponding light-receiving devices in the light receiver 3 and the interruption of any one optical beam is detected. The light receiver 3 is also equipped with an indicator 8 that signals the operating status of the area sensor.

In accordance with the control by the controller 4, the light-projecting devices 21 in the light projector 2 emit cyclically in sequence (e.g. from down to up) and with synchronism being ensured between a particular light-projecting device 21 and the corresponding light-receiving device 31 in the light receiver 3, only the corresponding light-receiving device 31 is rendered to be capable of light reception whereas the other light-receiving devices 31 are incapable of light reception. The reason for ensuring that only one corresponding light-receiving device 31 at a time is rendered to be capable of light reception is that the light from a particular light-projecting device 21 is not necessarily launched into the corresponding light-receiving devices 31 and there may be a case in which the same light is also launched into nearby light-receiving devices 31 as light of a comparatively high intensity. In other words, the conventional area sensor is of such a design that the light reception signals from all light-receiving devices 31 are collectively fed into a single binarizing circuit and, although a particular axis is interrupted by an object that has entered the detection area, the light launched into nearby light-receiving 31 causes the overall signal level to exceed a threshold and the sensor will erroneously determine that the projected light is being received by the light receiver and thus fails to achieve correct detection of the object that has entered the detection area.

On the other hand, if detection is continued with only one optical axis being cyclically rendered effective at a time, the entrance of an object or fingers or some other part of the human body into the detection area interrupts the optical axis 9 in the affected position so that it is no longer received by the corresponding light-receiving device 31, whereupon the sensor issued a warning signal or shuts down the machine to ensure safety for the operator.

FIG. 8 is a block diagram for the area sensor under consideration. The area sensor 1 comprises the light projector 2, the light receiver 3 and the (master) controller 4.

The light projector 2 comprises a desired number N of light-projecting devices 21 (211, 212, ... 21N) in the form of light-emitting diodes or the like that are spaced on a desired pitch, say, 40 mm, N light projecting circuits 22 (221, 222, ... 22N) for driving these light-projecting devices 21, a gate array 23 that scan controls the N light-projecting circuits 22 on a time-sharing basis to perform the necessary processing for detecting abnormalities and displaying the detected abnormality, an indicator circuit 24 for signaling the operating status of the area sensor, a clocking oscillator circuit 25 and a power supply circuit 26. In the illustrated case, the operation of the light-projecting circuits 22 is controlled by using the gate array 23. Needless to say, the gate array may be replaced by other control devices such as a CPU.

The lights receiver 3 comprises a desired number N of light-receiving devices 31 (311, 312, ... 31N) in the form of phototransistors or the like that are spaced on the same pitch as the light-projecting devices 21 in the light projector 2, N light-receiving circuits 32 (321, 322, ... 32N) for performing I-V (current voltage) conversion on the light reception signals from the respective light-receiving device 31, a gate array 33 that scan controls the N light-receiving circuits 32 on a time-sharing basis in synchronism with the corresponding light-projecting devices 21, an indicator circuit 34 that displays the status of the associated area sensor, a clocking oscillator circuit 35, a power supply circuit 36, a light reception signal processing circuit 37 that collectively amplifies, binarizes and detects the light reception signals from the light-receiving circuits 32, a detection signal output circuit, and an output circuit 38 for delivering sync signals. Besides synchronous scan control, the gate array 33 performs auxiliary detecting operations, abnormality detecting operations and processing for displaying the results of detection. As in the case of the gate array 23, the gate array 33 of course can be replaced by other control devices such as a CPU.

The controller 4 includes a control circuit 41 in the form of a gate array; the control circuit 41 receives an external input from an external input circuit using an input terminal, a mode setting from a mode setting circuit using a DIP switch, and a signal indicative of the status of light projection from a sensor connector 42 to the light projector via a light projection status signal input circuit; the control circuit 41 also receives the aforementioned detection output and a system sync signal from a sensor connector 43 to the light receiver via a detection signal input circuit and a sync signal input circuit, respectively. The control circuit 41 delivers the following three signals from an output circuit 47: a sync signal, a mode setting signal and a shutdown output signal that are respectively sent to the light projector 2, the light receiver 3 and the press machine or the like. In addition, the control circuit 41 causes an indicator LED to be lit for indicating via an indicator circuit 48 that the controller 4 is in operation and it receives from a key switch a signal for disengaging the controller 4 from a locked-out state. The controller 4 also includes a system power supply circuit 49 for supplying operating energy to the light projector, the light receiver and the controller, an internal power supply circuit 46 with which the voltage from the system power supply circuit 49 is converted to a constant operating voltage for the control circuit, and an oscillator circuit 45 for clocking the controller.

The above-described circuit configurations of the light projector, light receiver and the controller are just one example and other configurations may be employed; for example, the circuits in the controller 4 may optionally be transferred to the light projector 2 or the light receiver 3; conversely, the circuits in the light projector 2 or the light receiver 3 may be transferred to the controller 4. Thus, the individual circuits of interest are by no means limited to those shown in FIG. 8.

The foregoing description applies to the case where only one area sensor is employed. If more than one area need be detected, a corresponding number of such area sensors are necessary. FIG. 7 shows a conventional case of the controller circuit configuration that is employed with more than one area sensor.

In the case shown in FIG. 7, two area sensors 1 and 1' are employed. According to one approach, area sensor 1 includes a light projector 2, a light receiver 3 and a master controller 4 that have the same circuit configurations as the light projector 2, the light receiver 3 and the controller 4 that are shown in FIG. 8. Similarly, the area sensor 1' includes a light projector 2', a light receiver 3' and a master controller 4' that also have the same circuit configurations as shown in FIG. 8. Thus, the two master controllers 4 and 4' each have a detecting portion and an output circuit and as a system they are independent of each other. Such master controllers are used in parallel. A problem with the control using the master controllers 4 and 4' that are operated in a totally independent manner is that even if a light-receiving device in one area sensor which should inherently be prevented from receiving light may happen to receive the light from a light-projecting device in the light projector in a nearby area sensor. In order to avoid this dangerous situation, the light projectors 2 and 2' are synchronized and all the light-projecting devices are scan lit sequentially at specified intervals that take into account the timings of light emission from those light-projecting devices. All light-receiving devices in the light receivers 3 and 3' that pair with the light projectors 2 and 2' as allowed to perform scanned light reception in synchronism with those emission timings.

Instead of the control using the master controllers 4 and 4' in a totally independent manner, the master controller 4 may be used as a common controller of the two area sensors whereas the master controller 4' is dedicated to the transfer of signals between the two sensors. Between these two extremes, there are many approaches depending on the way how the responsibility for control is shared by the two controllers and the choice of a specific approach is a design matter.

If the power supply circuit is connected to the system power supply for the master controller via an extension connector which is indicated by 44 in FIG. 8, the problem of cumbersomeness in installation is solved since there is no need to thread power cables.

Speaking of a capability for the addition of area sensors, if 64 optical axes can be scanned within a period of 7 ms, the number of operable optical axes can be increased up to 64. Needless to say, the master controller 4 can perform the necessary control even if no optical axes area added. Assume here that the area sensor 1 has 16 optical axes; in this case, lines corresponding to 16 optical axes are turned on and those corresponding to the remaining 48 optical axes are turned off to enable the necessary control. Thus, there is no need to replace the master controller 4 by a different one in response to an increase or decrease in the number of optical axes. Not a single part of the electric circuits need be changed.

The master controller is also required to recognize the addition of a slave controller. One possible way to meet this need is by the operator selecting between settings with a switch or like means so as to ensure that the master controller can recognize how many slave controllers have been added. However, this approach of having the operator recognize the number of extensions of slave controllers has been problematic since he may inadvertently forget to enter a setting or make a wrong setting.

One possible way to recognize the addition of a slave controller is shown generally in FIGS. 6A and 6B. In FIG. 6A, a master controller 4 has an extension recognizing circuit and a slave controller 5 to be connected to the master controller 5 also has an extension recognizing circuit. The extension recognizing circuit in the master controller 4 has a control circuit 1 to which a line voltage Vcc is connected via a resistance R; the recognizing circuit also has a control circuit 2 to which a line voltage Vcc is connected via a resistance R. The extension recognizing circuit in the slave controller 5 has corresponding shorting circuits that are connected to the ground, such that when the connector on the slave controller 5 is connected to the connector on the master controller 4, the control circuits 1 and 2 are rendered to a low (L) level.

Assume here that only the master controller 4 is in operation without being connected to the slave controller 5 (see FIG. 6A). In this case, the control circuits 1 and 2 in the master controller 4 are supplied with Vcc to be rendered to a high (H) level., whereupon the extension recognizing circuit concludes that "no slave controller is added".

If the slave controller 5 is connected to the master controller 4 as shown in FIG. 6B, the shorting circuits in the slave controller 5 that are connected to the ground allows the control circuits 1 and 2 to be rendered to a "L" level, whereupon the extension recognizing circuit concludes that "a slave controller is added".

Thus, the conventional method depends upon the presence or absence of connection of the slave controller 5 to automatically determine whether the slave controller 5 has been "added" or "not added".

With the above-described approaches, there has been no problem in ordinary cases. However, if an abnormal event occurs as exemplified by the connector on the slave controller 5 coming off the master controller 4, the operator being unaware of that event may fail to reconnect the connector to the master controller despite the addition of an area sensor. In this case, an output signal for the interruption of light in a certain optical axis will not be transmitted to the associated control circuit and the press machine or some other apparatus under control fails to stop intermediately, which is a very dangerous situation.

SUMMARY OF THE INVENTION

The present invention has been accomplished with a view to solving the abovestated problem and has as an object providing a controller that satisfies the following two requirements:

1) avoiding the possibility of a danger in which despite the addition of an area sensor, the controller fails to correctly recognize the number of area sensors on account of an electrical trouble such as a dislodged connector; whereby it becomes incapable of detecting the apparent installation of more than one area sensor; and 2) eliminating the need of the operator to recognize the number of extensions of slave controllers by selecting settings on a switch or like means since the operator may inadvertently forget to enter a setting or make a wrong setting.

To attain objects, according to the present invention, there is provided a method of verifying the addition of a slave controller to the master controller of more than one area sensor by electrical means of recognizing its extension, wherein a cover is mechanically connected to said master controller when no slave controller is added, thereby ensuring that not only the extension but also the non-extension of a slave controller can be verified.

According to another aspect of the invention, the non-extension of a slave controller is verified by the cover acting on a built-in switch in the master controller.

According to yet another aspect of the invention, a projection is provided on the cover which, in turn, is attached to the master controller, and the projection acts on the switch.

In yet another aspect of the invention, an electrically shorting circuit that shorts the contacts of the switch is provided in the cover which, in turn, is attached to the master controller, and the shorting circuit acts on the switch.

According to a still further aspect of the invention, there is provided a master controller of area sensors capable of verifying the addition of an area sensor, which detects and controls area sensors each having a multiple of optical axes connecting a light projector and a light receiver and which has an extension recognizing circuit that operates electrically upon connecting a slave controller to the master controller for adding an area sensor, wherein the master controller further includes a switch for releasing the extension recognizing circuit from recognizing a slave controller and a manipulation hole through which the switch is manipulated from the outside of the master controller.

In yet another aspect of the invention, a cover is used when no slave controller is added and which is connected to the master controller mentioned above, which will act on the switch via the manipulation hole.

In yet another aspect of the invention, a projection that passes through the manipulation hole to turn on the switch capable of recognizing the addition of a slave controller.

According to a still further aspect of the invention, an electrically shorting circuit passes through the manipulation hole to short the contacts of the switch capable of recognizing the addition of a slave controller.

In short, according to the invention, the area sensors of a type that permits the addition of a controller is such that instead of solely depending upon electrical multiplexing to avoid a dangerous event that occurs on account of the nature of the system as an extendable type, a mechanical element is additionally employed when no controller is added, thereby reducing the potential hazard to an acceptably low level.

DETAILED DESCRIPTION OF THE PREFERRED EMBODIMENTS

A preferred embodiment of the invention will now be described with reference to FIGS. 1A to 4.

Figure 1A:
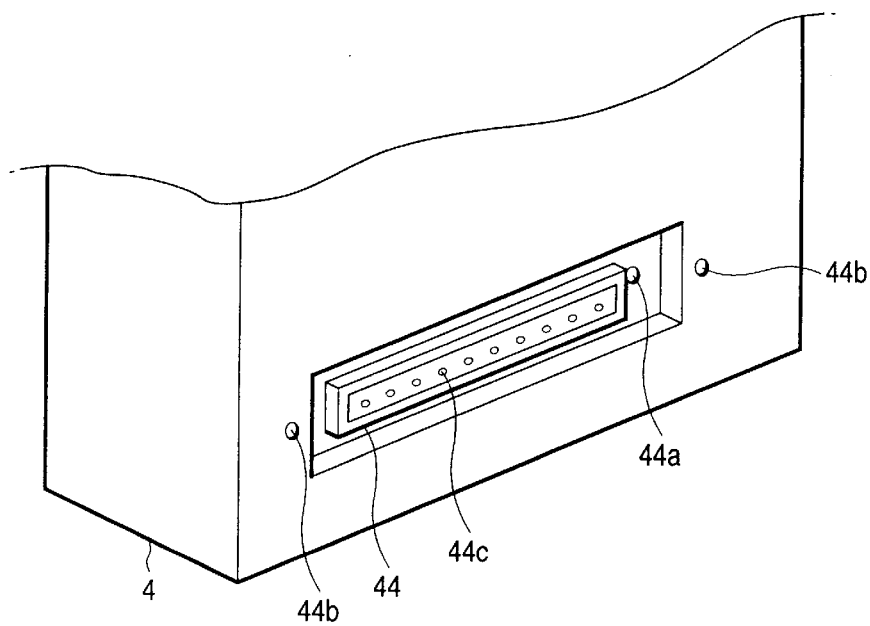
FIGS. 1A to 1C show in perspective a master controller, a cover of the invention to be connected to the master controller and a controller on a slave controller to be connected to the master controller, according to a first embodiment of the present invention.
Figure 1B:
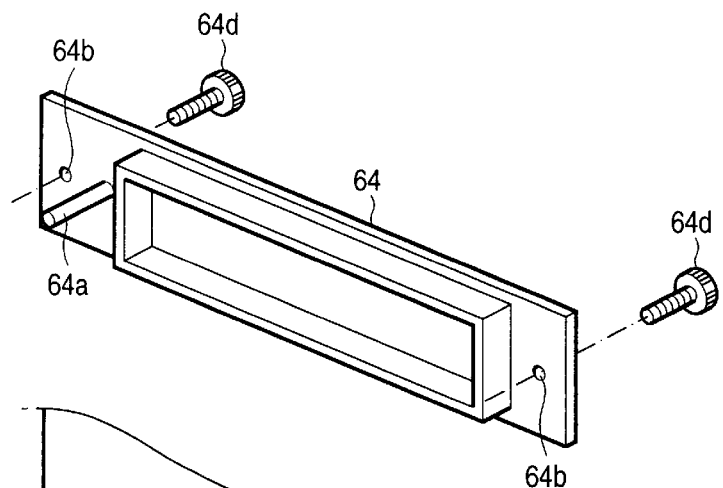

FIG. 1A is a perspective view of a master controller 4 according to an embodiment of the present invention; FIG. 1B is a perspective view of a cover 64 according to the embodiment of the invention and which is to be connected to the master controller 4 when no slave controller is added; and FIG. 1C is a perspective view of a connector 54 on a slave controller to be added to the master controller 4.

Figure 1C:
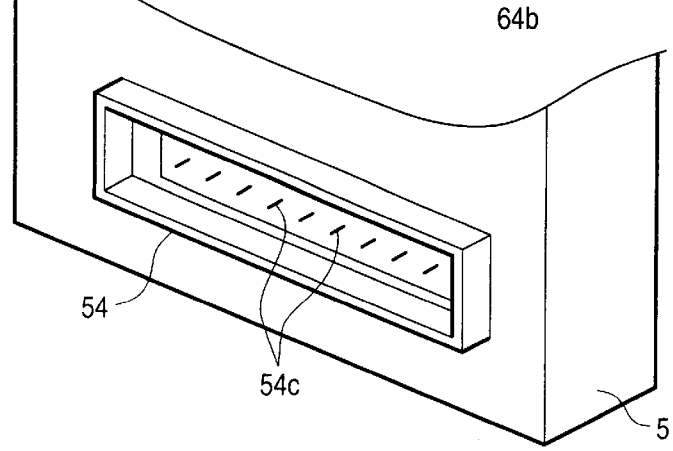
Figure 2:
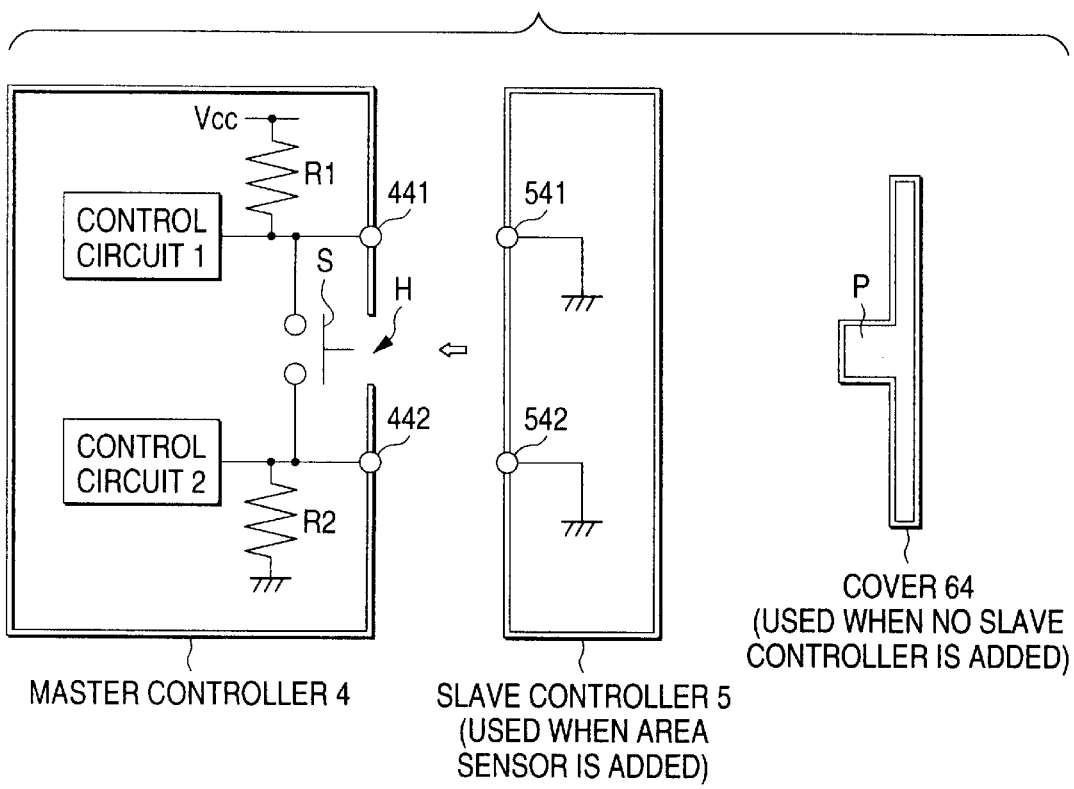
FIG. 2 shows the extension recognizing circuits in the three components shown in FIG. 1.

FIG. 2 shows the extension recognizing circuits in the three components shown in FIGS. 1A to 1C.

Figure 3:
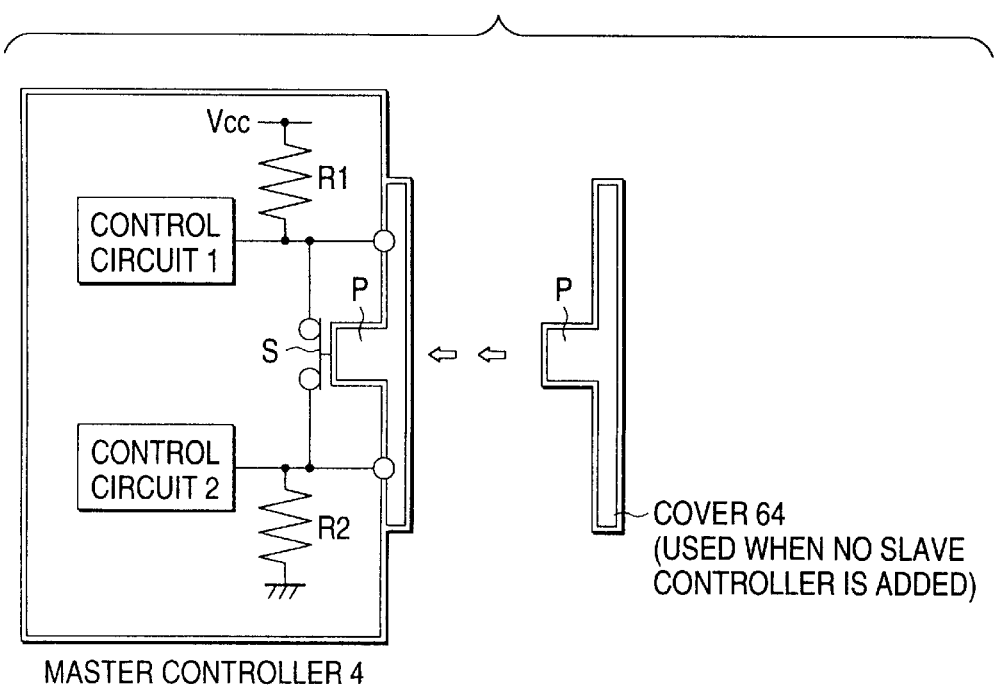
FIG. 3 shows how the extension recognizing circuit in the master controller shown in FIG. 2 is connected to the cover shown in FIG. 2.

FIG. 3 shows how the extension recognizing circuit in the master controller 4 shown in FIG. 2 is connected to the cover 64 shown in FIG. 2.

Figure 4:
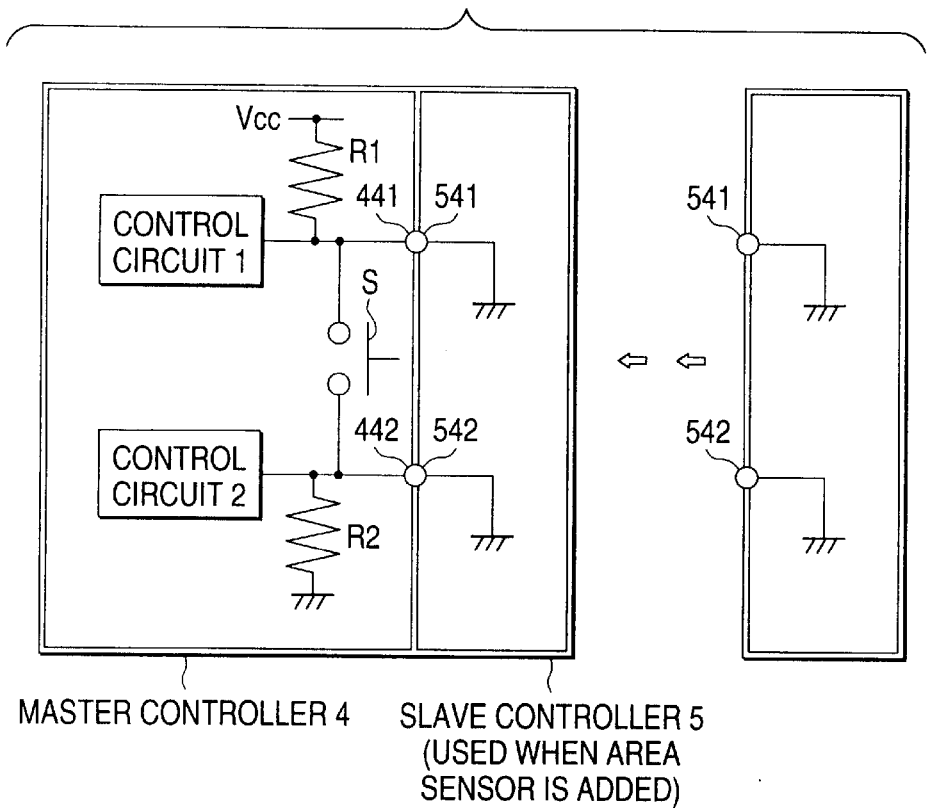
FIG. 4 shows how the extension recognizing circuit in the master controller shown in FIG. 2 is connected to the extension recognizing circuit in the slave controller shown in FIG. 2.

FIG. 4 shows how the extension recognizing circuit in the master controller 4 shown in FIG. 2 is connected to the extension recognizing circuit in the slave controller 5 shown in FIG. 2.

As shown in FIG. 1a, the master controller 4 has an extension connector 44 in its lower part and on the side to which a slave controller of an extension area sensor is to be added. The connector 44 has a multiple of holes 44c into which connector pins are to be inserted. The number of holes 44c depends on the way how the responsibility for control is shared by the master controller 4 and the slave controller 4. A manipulation hole 44a is to be provided in the master controller 4 according to the invention as will be described below. Two attachment holes 44b are provided on opposite sides of the connector 44.

The cover 64 according to the third aspect of the invention which is shown in FIG. 1B must be attached to the master controller 4 in such a way as to cover the extension connector 44 when no slave controller is added to the master controller. To this end, attachment holes 64b on opposite ends of the cover are placed into registry with the attachment holes 44b in the master controller 4 and fastening means such as screws 64d are inserted into the master controller 4 to fix the cover. At the same time, a projection 64a on the cover 64 is inserted into the manipulation hole 44a in the master controller 4.

As shown in FIG. 1C, the connector 54 on the slave controller 5 has connector pins 54c in positions that correspond to the insertion holes 44c in the master controller 4. When an extension area sensor is to be added, the light projector and the light receiver in that area sensor are connected to the slave controller 5 and, at the same time, the connector 54 on that slave controller is plugged into the connector 44 on the master controller 4. Thereafter, the housings of the two controllers are fixed by means of screws not shown.

FIG. 2 shows the extension recognizing circuits in the three components shown in FIG. 1. FIG. 2 shows a circuit for generating extension recognizing signals that are to be applied to control circuits 1 and 2 in the master controller 4. Briefly, extension recognizing signals are generated by picking up external signals via connector pin insertion holes 441 and 442 in the extension connector 44. As shown in FIG. 2, the control circuit 1 in the master controller 4 has a line voltage Vcc connected via a resistance R1; the control circuit 1 is also connected to the insertion hole 441. The control circuit 2 in the master controller 4 is connected not only to a resistance R2 but also to the insertion hole 442. The other end of the resistance R2 is grounded. Normally open contacts S in a switch are connected between the insertion pins 441 and 442. The housing of the master controller 4 has a manipulation hole H through which the normally open contacts S can be accessed from outside. The resistance values of R1 and R2 may have a ratio of 1:10 (resistance R1=1 kΩ; resistance R2=10 kΩ).

Because of the arrangement just described above, closure of the normally open contact S causes a "H" input level to be supplied to the control circuits 1 and 2, whereupon "no addition of a slave controller" is detected.

FIG. 2 also shows the circuit provided in the slave controller 5 for generating extension recognizing signals; the circuit depends on two connector pins 541 and 542 on the extension connector 54 for generating extension recognizing signals in the master controller 4. As shown in FIG. 2, the two connector pins 541 and 542 are both grounded. Upon connecting the pins 541 and 542 into the insertion holes 441 and 442 in the master controller 4, both control circuits 1 and 2 are grounded, whereby "the addition of a slave controller" is detected. Details of this event will be described later with reference to FIG. 4.

Furthermore, FIG. 2 shows the structure of the cover 64 to be attached to the master controller 4 as long as no slave controller is added. The cover 64 has a projection P which, when the cover is attached to the master controller 4, passes through the manipulation hole H in its housing to access the switch which is pressed to close the normally open contacts S, whereupon the control circuits 1 and 2 are supplied with "H" signals, indicating "no addition of a slave controller". Details of this event will be described just below with reference to FIG. 3.

FIG. 3 shows how the extension recognizing circuit in the master controller 4 shown in FIG. 2 is connected to the cover 64 shown in FIG. 2. As shown, the projection P on the cover 64 closes the normally open contacts S in the master controller 4 so that resistances R1 and R2 are connected in series and the potential at their junction is applied to both control circuits 1 and 2. Specifically, voltage V1 applied to the control circuit 1 and voltage V2 applied to the control circuit 2 are expressed by the following:

$$V1=V2=\{R2/(R1+R2)\} \times Vcc$$

$$=\{10/(1+10)\} \times Vcc$$

$$=(10/11) \times Vcc$$

$$\cong Vcc(H \text{ level})$$

Thus, by attaching the cover 64 to the master controller 4 when no slave controller is added, a signal of "H" level is supplied to both control circuits 1 and 2.

FIG. 4 shows how the extension recognizing circuit in the master controller 4 shown in FIG. 2 is connected to the extension recognizing circuit in the slave controller 5 shown in FIG. 2. As shown, both control circuits 1 and 2 are grounded by the internal circuit in the slave controller 5. Therefore, voltage V1 applied to the control circuit 1 and voltage V2 applied to the control circuit 2 are expressed by the following:

$$V1=V2=0 (\text{``}L\text{'' level}).$$

Thus, by adding the slave controller 5 to the master controller 4, a signal of "L" level is supplied to both control circuits 1 and 2.

Having described above the characteristic circuit configurations associated with the master controller of the invention, we now explain how it works if a certain abnormal event occurs as exemplified by the connector on the slave controller 5 coming off the master controller 4. If the connector 54 on the slave controller 5 comes off the master controller 4, neither the connector 54 nor the cover 64 is connected to the master controller 4 and the circuit in this case is as shown in FIG. 2. Neither control circuit 1 nor control circuit 2 is grounded and normally open contacts S are not closed; hence, the input voltage V1 to the control circuit 1 is equal to Vcc and the input voltage V2 to the control 2 is equal to the ground potential as shown below:

$$V1=Vcc (\text{``}H\text{'' level})$$

$$V2=0 (\text{``}L\text{'' level})$$

Thus, any abnormal event can be detected by the supply of a signal of "H" level to the control circuit 1 and a signal of "L" level to the control circuit 2.

The foregoing explanation may be summarized as follows.

If indicator lamps L1 and L2 are provided that are lit when supplied with input voltage V1 to the control circuit 1 and input voltage V2 to the control circuit 2, the following events will occur:

In Normal Mode:

(1) When no slave controller is added:

$$L1=ON; L2=ON,$$

(2) When slave controller is added:

$$L1=OFF; L2=OFF,$$

In Abnormal Mode:

$$L1=ON; L2=OFF.$$

As described on the foregoing pages, the present invention requires that a cover be mechanically connected to the master controller as long as no slave controller is added. The projection on the cover connected to the master controller turns on the switch on the input side of the control circuits 1 and 2. On the other hand, if an abnormal event occurs as exemplified by the connector 54 on the slave controller 5 coming off the master controller 4, neither the cover nor the connector is connected to the master controller and this fact helps detect the abnormality.

Figure 5:
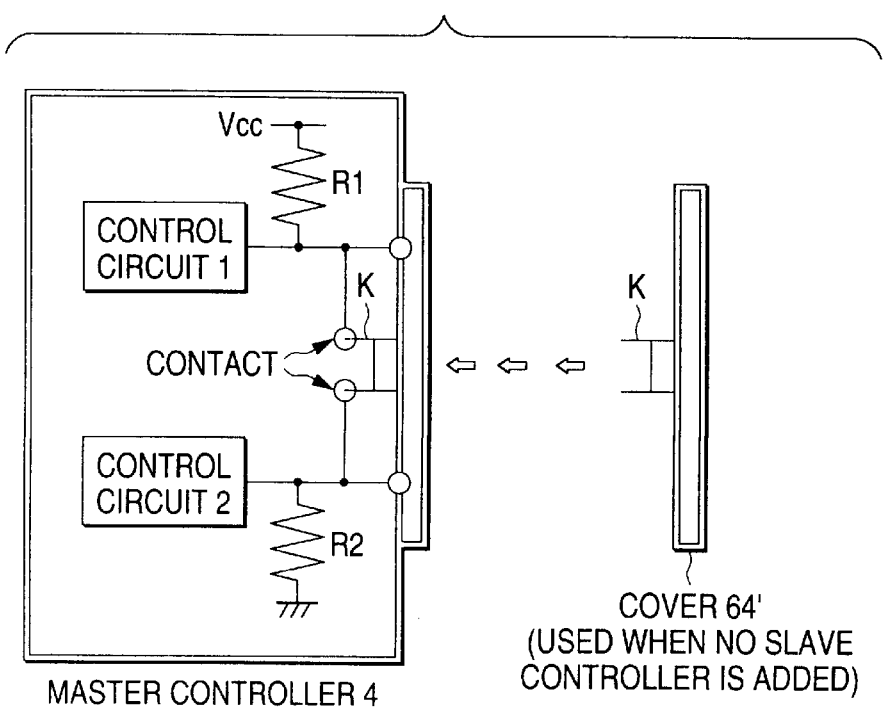
FIG. 5 shows a second embodiment of the invention.
Figure 6A:
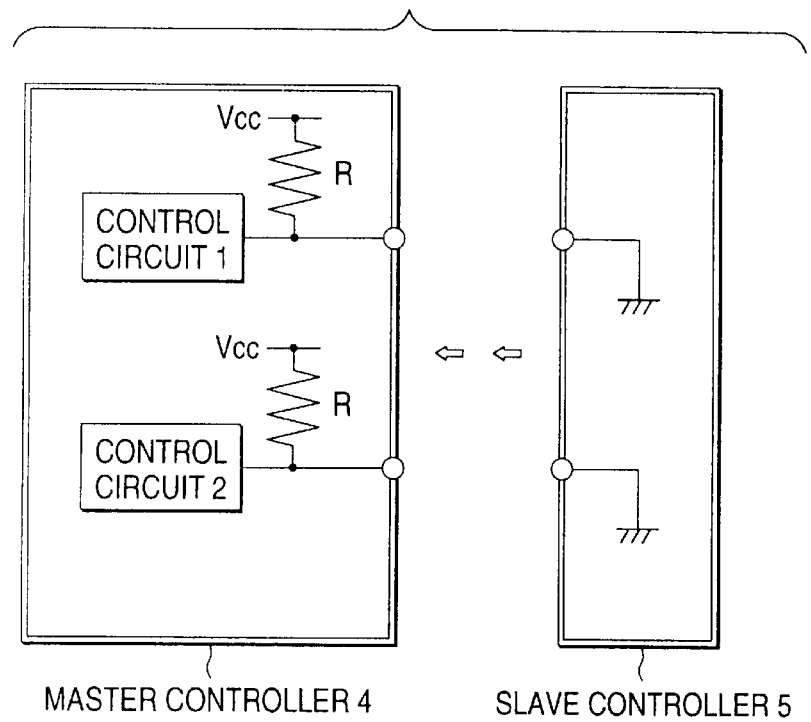
FIGS. 6A and 6B show a method that is generally conceived to recognize the addition of a slave controller in the case of using more than one area sensor.
Figure 6B:
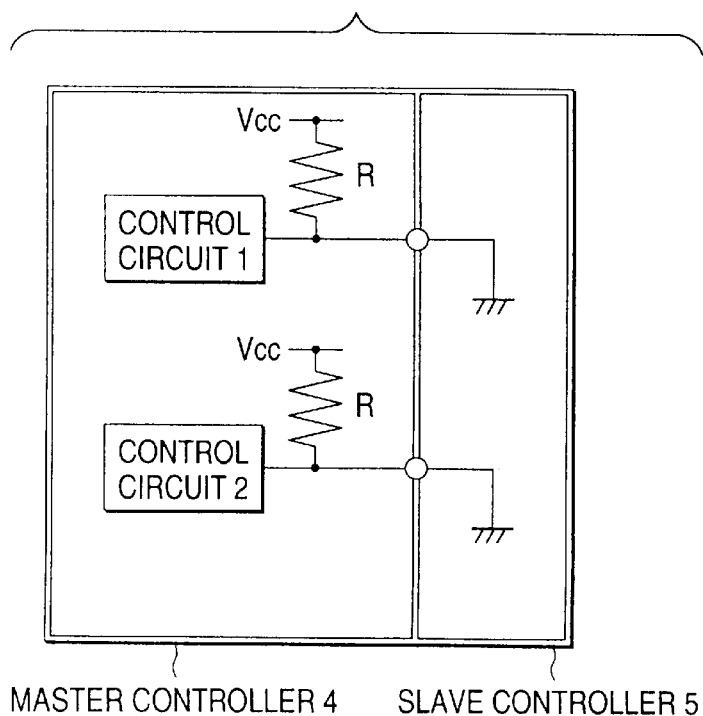
Figure 7:
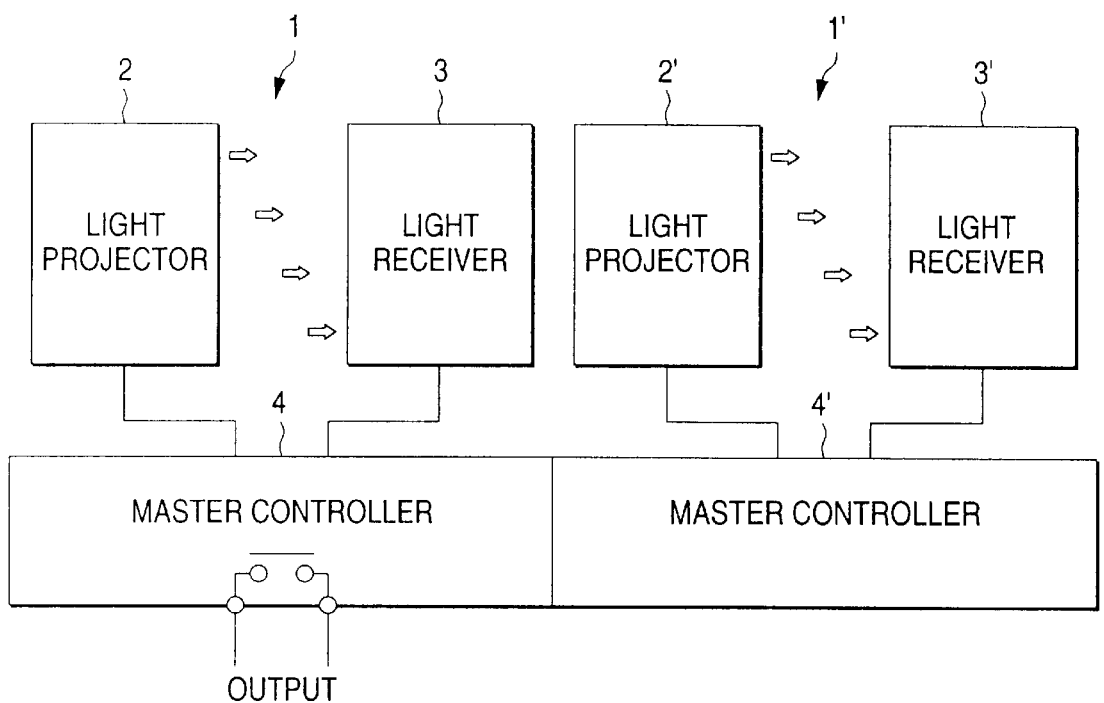
FIG. 7 shows a conventional case of the control circuit configuration that is employed with more than one area sensor.
Figure 8:
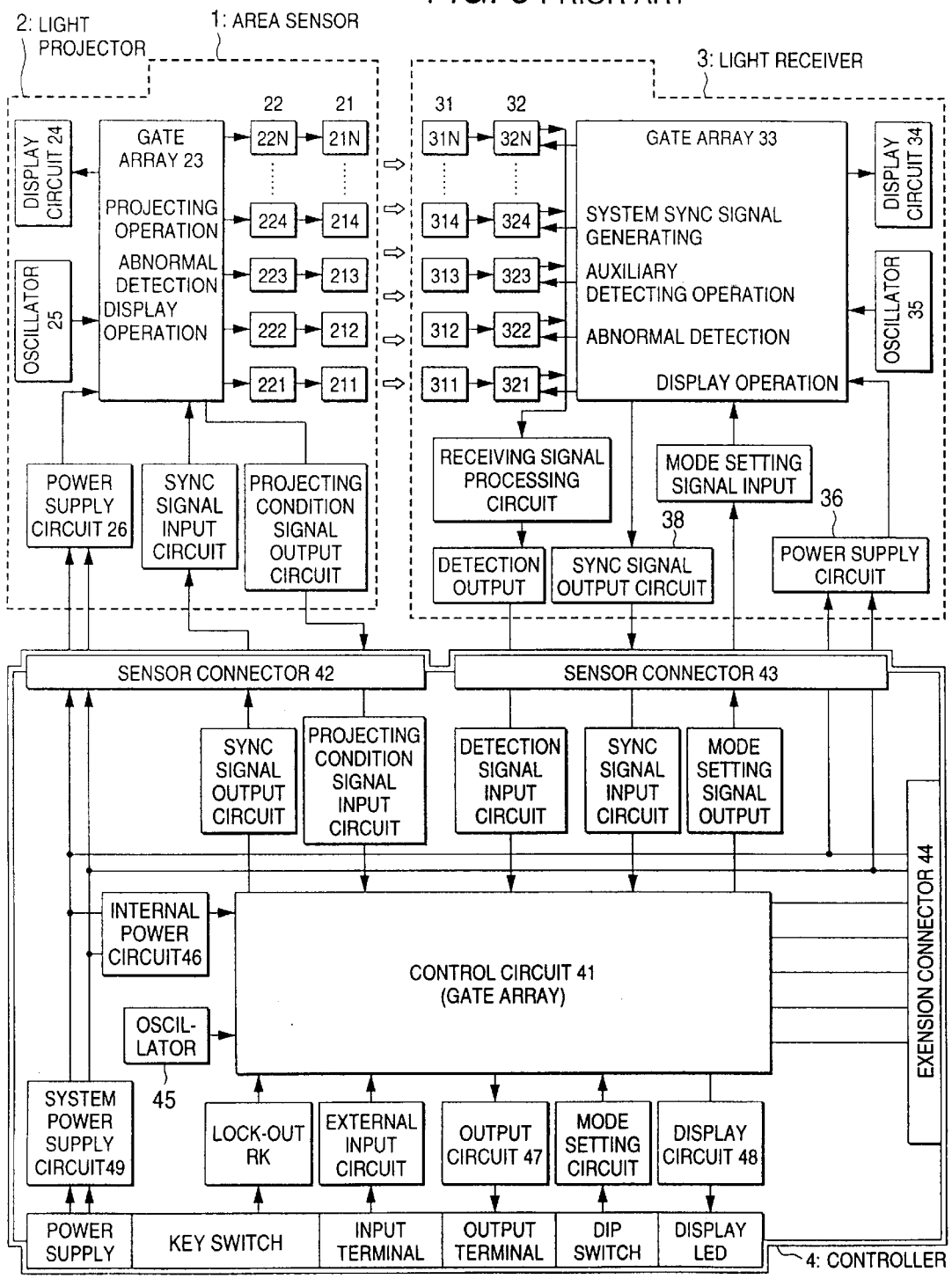
FIG. 8 is a block diagram for the area sensor of the type shown in FIG. 7.
Figure 9:
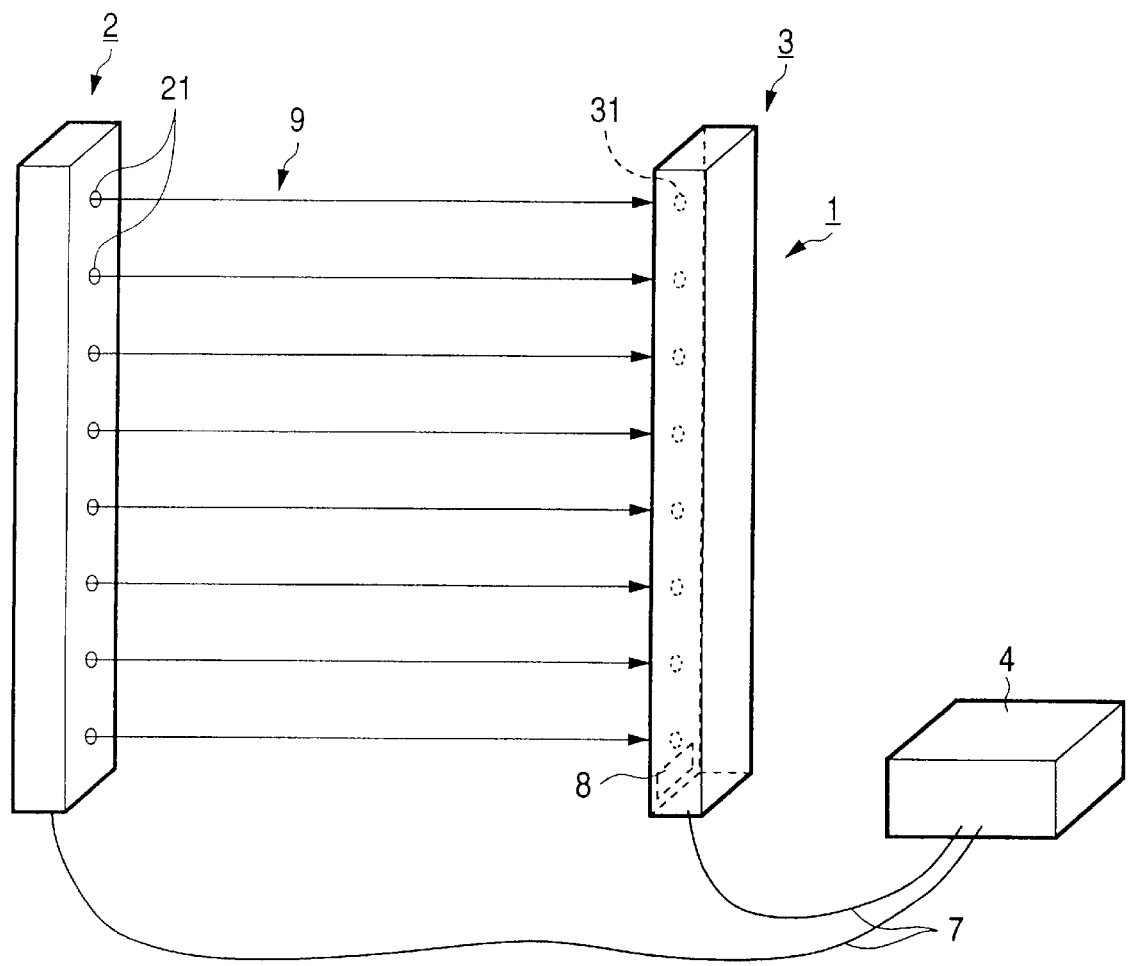
FIG. 9 is a diagrammatic perspective view of a common area sensor.

In the embodiment described above, the projection on the cover which is attached to the master controller when no slave controller is added is used as a means of detecting abnormalities. This is not the sole case of the invention and the projection may be replaced by any means that acts on the switch on the input side of the control circuits 1 and 2. FIG. 5 shows an exemplary case of such alternative means and a cover 64' is provided with a shorting circuit K that includes a metallic part that shorts the contacts of the switch.

When the cover 64' fitted with the shorting circuit K is connected to the master controller 4 in the direction indicated by open arrows, the contacts of the switch are shorted so that resistances R1 and R2 are connected in series and the potential at their junction is applied to both control circuits 1 and 2. Specifically, voltage V1 applied to the control circuit 1 and voltage V2 applied to the control circuit 2 are expressed by the following:

$$V1=V2=\{R2/(R1+R2)\} \times Vcc$$

$$=\{10/(1+10)\} \times Vcc$$

$$=(10/11) \times Vcc$$

$$\cong Vcc(\text{``H''level})$$

Thus, by attaching the cover 64' to the master controller 4 when no slave controller is added, a signal of "H" level is supplied to both control circuits 1 and 2.

The detailed description of action of the master controller 4 when it is connected to the slave controller 5 is not given here since it is similar to what has been described with reference to FIG. 4. The action of the master controller 4 when an abnormal event has occurred also need not be described since it is identical to what has been described with reference to FIG. 2. The foregoing explanation of the case of using cover 64' fitted with the shorting circuit K may be summarized as follows.

In Normal Mode:

(1) When no slave controller is added:

$L1=\text{ON}; L2=\text{ON}$ (2) When slave controller is added:

$L1=\text{OFF}; L2=\text{OFF}$

In Abnormal Mode:

$L1=\text{ON}; L2=\text{OFF}.$

As described above, it is required in another embodiment of the present invention that a cover fitted with a shorting circuit be mechanically connected to the master controller as long as no slave controller is added. The shorting circuit in the cover connected to the master controller shorts the contacts on the input side of the control circuits 1 and 2. This arrangement enables the detection of an abnormal event such as the connector 54 on the slave controller 5 coming off the master controller 4.

The foregoing embodiments assume the addition of only one area sensor. Needless to say, two or more extension area sensors may be added if signal processing in the master controller is performed in a different way. In this case, slave controllers may also be added and if signal lines for recognizing their extension are increased in number according as two or more slave controllers are added, the addition of each slave controller can be recognized in a fail-safe manner by the positive use of a mechanical element.

As described on the foregoing pages, the present invention requires that a cover having a projection or a shorting circuit be mechanically attached to the master controller as long as no slave controller is added. If an abnormal event occurs as exemplified by the connector 54 on the slave controller 5 coming off the master controller 4, the absence of the cover helps detect that abnormality.

What is claimed is:

1. A method of verifying an addition of a slave controller to a master controller of more than one area sensor by electrical means of recognizing an extension of the slave controller, comprising the step of:

detecting, via the electrical means, whether a cover is mechanically connected to the master controller, the cover being connected to the master controller indicating that the slave controller is not present.

2. The method according to claim 1, wherein the detecting step includes the step of:

attaching the cover to the master controller such that the cover acts on a built-in switch in the master controller.

3. The method according to claim 2, wherein a projection is provided on the cover, and the projection is inserted into the master controller and acts on the switch.

4. The method according to claim 2, wherein an electrically shorting circuit that shorts contacts of the switch is provided in the cover which, in turn, is attached to the master controller, and the shorting circuits acts on the switch.

5. The method according to claim 1, wherein the detecting step includes the step of:

detecting an abnormality of the slave controller when the mechanical connection of the cover and an extension of the slave controller are not detected.

6. A master controller of area sensors, each having multiple optical axes, the master controller comprising:

an extension recognizing circuit electrically connectable to a slave controller for adding an extension area sensor;

a switch which, when manipulated, prevents the extension recognizing circuit from recognizing a slave controller; and a manipulation hole through which the switch is externally manipulated from the master controller.

7. The master controller according to claim 6, further comprising:

a cover which is mechanically attached to the master controller, which acts on the switch via the manipulation hole to manipulate the switch and to indicate that no slave controller is present.

8. The master controller according to claim 7, wherein the cover has a projection which is inserted in the manipulation hole to manipulate the switch and prevent the recognition of the slave controller.

9. The master controller according to claim 7, wherein the cover has an electrically shorting circuit that passes through the manipulation hole to short contacts of the switch and prevent the recognition of the slave controller.

* * * * *